(12) United States Patent
Kim

(10) Patent No.: US 9,553,340 B2
(45) Date of Patent: Jan. 24, 2017

(54) RECHARGEABLE BATTERY MODULE

(71) Applicants: SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 56 days.

(21) Appl. No.: 14/186,017

(22) Filed: Feb. 21, 2014

(65) Prior Publication Data

US 2014/0356668 A1 Dec. 4, 2014

(30) Foreign Application Priority Data

May 30, 2013 (KR) .................. 10-2013-0062047

(51) Int. Cl.
*H01M 10/42* (2006.01)
*H01M 2/20* (2006.01)
*H01M 10/48* (2006.01)
*H01M 2/04* (2006.01)
*H01M 2/02* (2006.01)
*H01M 2/10* (2006.01)
*H01R 11/28* (2006.01)

(52) U.S. Cl.
CPC ......... *H01M 10/425* (2013.01); *H01M 2/1016* (2013.01); *H01M 2/202* (2013.01); *H01M 10/482* (2013.01); *H01M 2/021* (2013.01); *H01M 2/04* (2013.01); *H01M 2/1061* (2013.01); *H01M 2/1077* (2013.01); *H01R 11/288* (2013.01)

(58) Field of Classification Search
CPC ............................ H01M 10/425; H01M 2/06
See application file for complete search history.

(56) References Cited

U.S. PATENT DOCUMENTS

| 4,448,000 A * | 5/1984 | Manuccia | B01J 3/03 |
| | | | 277/641 |
| 2010/0124693 A1* | 5/2010 | Kosugi et al. | 429/92 |
| 2010/0173189 A1 | 7/2010 | Suzuki | |
| 2011/0097620 A1* | 4/2011 | Kim | 429/161 |
| 2011/0135970 A1* | 6/2011 | Han et al. | 429/7 |
| 2013/0189563 A1 | 7/2013 | Chang et al. | |
| 2013/0202929 A1* | 8/2013 | Kako et al. | 429/90 |

FOREIGN PATENT DOCUMENTS

| JP | 2009-277420 A | | 11/2009 | |
| JP | 2010205509 | * | 9/2010 | H01M 2/12 |
| JP | 2012-064555 | * | 3/2012 | H01M 2/20 |
| KR | 10-2010-0081956 A | | 7/2010 | |
| KR | 10-2011-0112082 A | | 1/2011 | |
| KR | 10-2012-0051808 A | | 5/2012 | |

OTHER PUBLICATIONS

Korean Office Action dated Jul. 21, 2016 in Corresponding Korean Patent Application No. 10-2013-0062047.

* cited by examiner

Primary Examiner — Jeremiah Smith
(74) Attorney, Agent, or Firm — Lee & Morse, P.C.

(57) ABSTRACT

A rechargeable battery module includes a plurality of unit cells including rechargeable batteries and adjacently disposed, at least one bus bar connecting electrode terminals of adjacent unit cells of the plurality of unit cells, and a cover configured to cover the plurality of unit cells, the cover including a coupling part coupled with the at least one bus bar, and a signal detector electrically connected to the bus bar.

9 Claims, 9 Drawing Sheets

RECHARGEABLE BATTERY MODULE

CROSS-REFERENCE TO RELATED APPLICATION

The present application claims priority under 35 U.S.C. §119 to Korean Patent Application No. 10-2013-0062047, filed on May 30, 2013, in the Korean Intellectual Property Office, and entitled: "Rechargeable Battery Module," which is incorporated by reference herein in its entirety.

BACKGROUND

1. Field

Example embodiments relate to a rechargeable battery module with improved reliability of a connection of a bus bar and a detection of a signal, and a simplified module assembling process.

2. Description of the Related Art

A rechargeable battery is a battery repeatedly performing charging and discharging, as opposed to a primary battery. A rechargeable battery with small capacity may be used in portable small electronic devices, e.g., a mobile phone, a notebook computer, and a camcorder, and a rechargeable battery with large capacity may be used as a motor driving power source, e.g., for a hybrid vehicle and an electric vehicle.

The rechargeable battery may be used as a single cell, e.g., a rechargeable battery in a small electronic device, or may be used in a module state having a plurality of electrically connected cells, e.g., a rechargeable battery for driving a motor. The rechargeable battery module is configured so that electrode terminals of cells, i.e., unit cells, are connected to bus bars, and a signal terminal is included in each bus bar to detect a signal for information on the unit cell. Each signal terminal is connected to a controller through a wire harness. For example, the bus bars may be connected to the electrode terminals of adjacent unit cells by welding, and a signal terminal may be connected to each bus bar.

SUMMARY

Example embodiments provide a rechargeable battery module with improved reliability of a connection of a bus bar and a detection of a signal, and with a simplified module assembling process.

An exemplary embodiment provides a rechargeable battery module, including a plurality of unit cells including rechargeable batteries and adjacently disposed, at least one bus bar connecting electrode terminals of adjacent unit cells of the plurality of unit cells, and a cover configured to cover the plurality of unit cells, the cover including a coupling part coupled with the at least one bus bar, and a signal detector electrically connected to the bus bar.

The coupling part may include an accommodation part protruding downwardly from the cover along a circumference of the bus bar, and a plurality of hooks protruding from sides of the accommodation part, the plurality of hooks being configured to affix the bus bar to the accommodation part.

The cover may include first through-openings, the first through-openings corresponding to electrode terminals of adjacent cells units.

The signal detector may include a signal terminal exposed through a second through-opening in the cover, the signal terminal corresponding to an upper portion of the bus bar and being connected to the bus bar, and a signal line embedded in the cover and connected to the signal terminal.

The signal detector may further include a connector at one side of the cover, the connector being connected to the signal line.

The rechargeable battery module may further include a gasket between the unit cells and the cover.

The cover may further include a drawing part at an external side of the coupling part, the drawing being at an outermost region and being configured to draw out the bus bar.

The drawing part may include a first drawing part in which the bus bar drawn out to the outside of the cover is disposed, and a second drawing part disposed at one side of the bus bar accommodated inside the cover.

The gasket may include first protrusions at the first drawing part and configured to seal the spaces between the bus bar and the unit cells, and second protrusions at the second drawing part and configured to seal the spaces between the second drawing part and the unit cells, and protruding higher than the first protrusions.

The at least one bus bar may be connected to the coupling part of the cover and to electrode terminals of adjacent unit cells, the at least one bus bar being between the cover and the unit cells.

The cover may include a plurality of first through-holes extending through the entire cover and exposing the at least one bus bar, the plurality of first through-holes overlapping the electrode terminals of adjacent unit cells connected by the at least one bus bar.

The coupling part may surround two first through-holes of the plurality of first through holes, the two first through-holes overlapping electrode terminals of two adjacent unit cells connected by the at least one bus bar.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
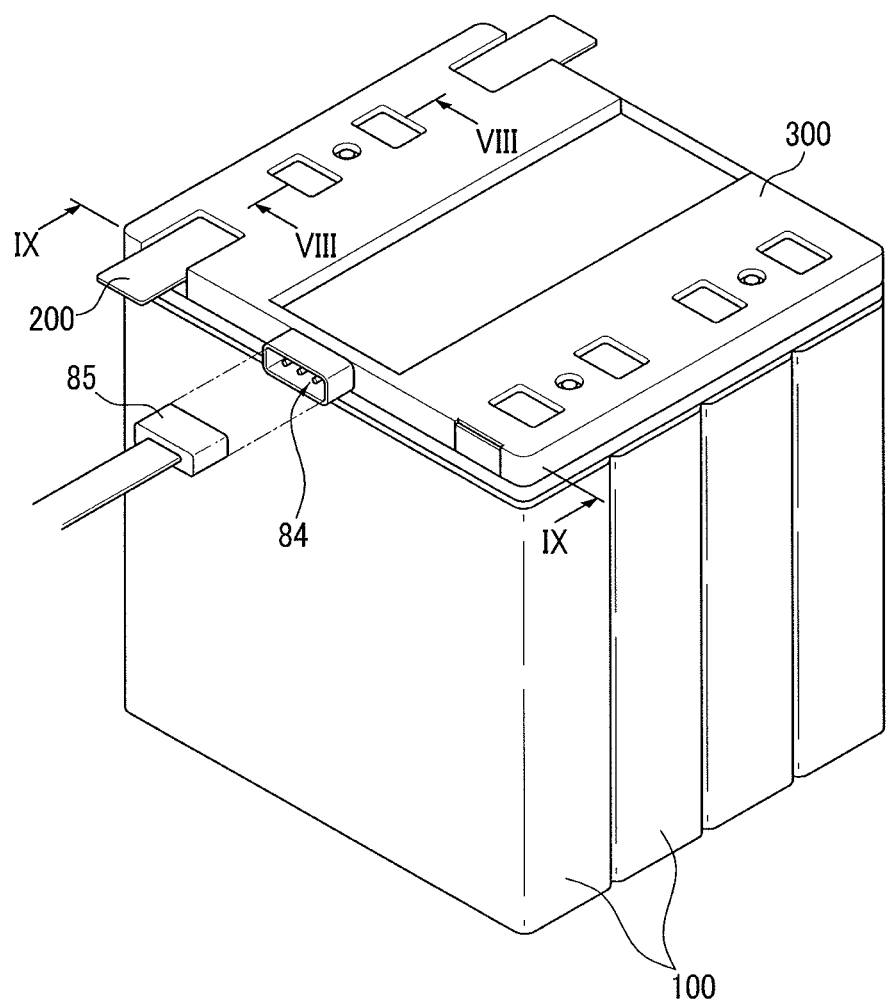
FIG. 1 illustrates a perspective view of a rechargeable battery module according to an exemplary embodiment.
Figure 2:
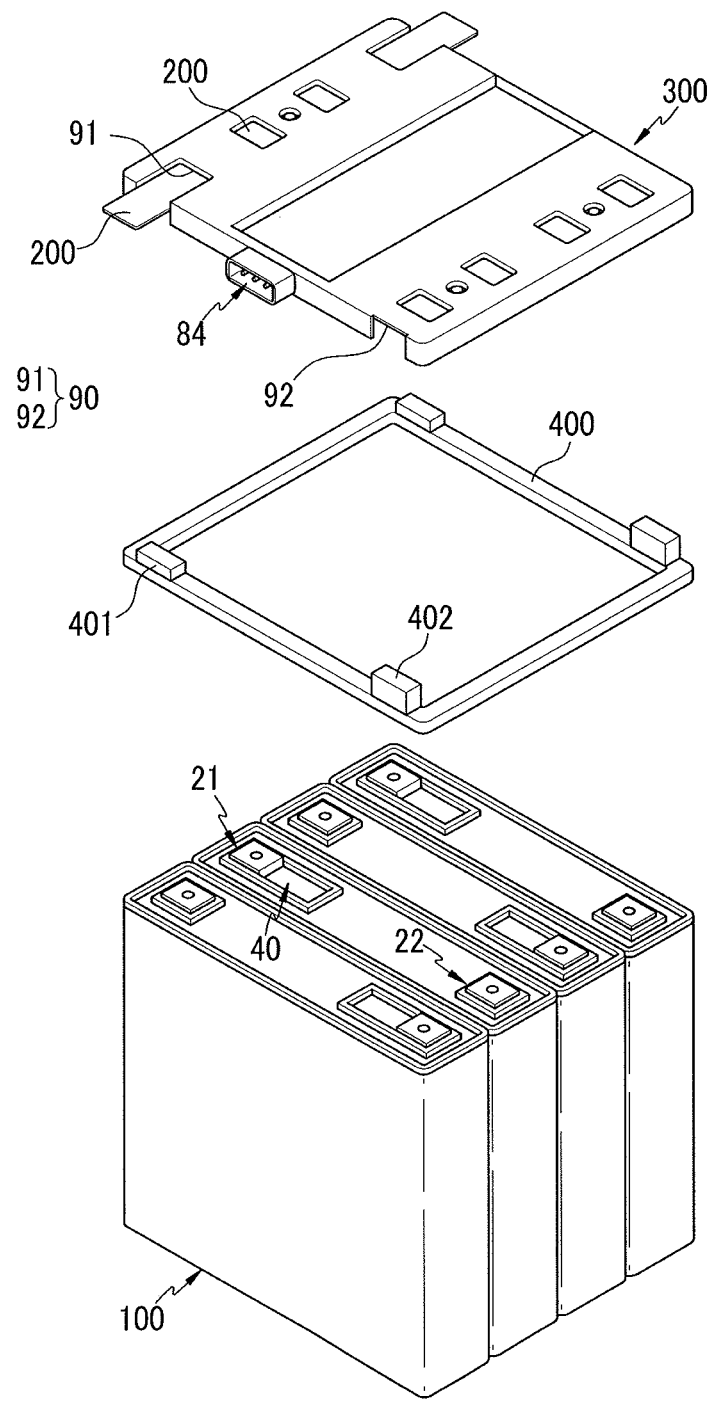
FIG. 2 illustrates an exploded perspective view of the rechargeable battery module illustrated in FIG. 1.

FIG. 1 illustrates a perspective view of a rechargeable battery module according to an exemplary embodiment, and FIG. 2 illustrates an exploded perspective view of the rechargeable battery in FIG. 1.

Referring to FIGS. 1 and 2, the rechargeable battery module according to the exemplary embodiment may include unit cells 100 formed of rechargeable batteries, and a cover 300 for covering the unit cells 100 while connecting the unit cells 100 with a bus bar 200. The cover 300 will be described in detail after describing the structure of the unit cell 100.

Figure 3:
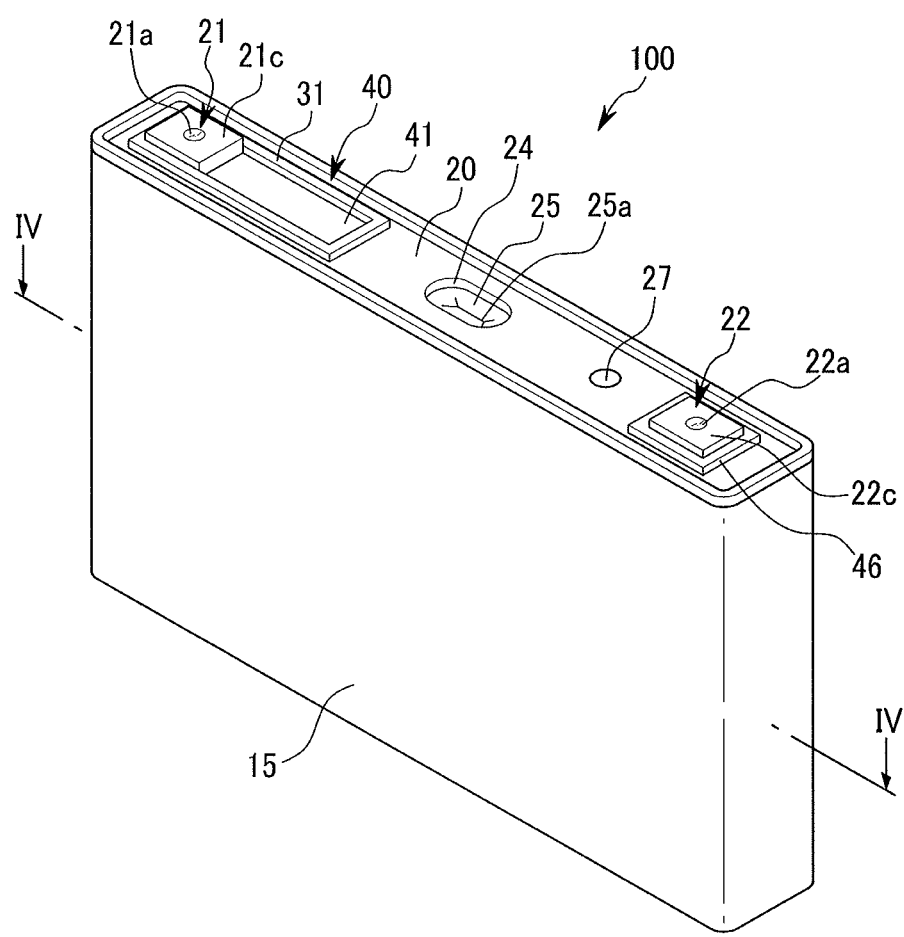
FIG. 3 illustrates a perspective view of a unit cell applied to FIG. 1.
Figure 4:
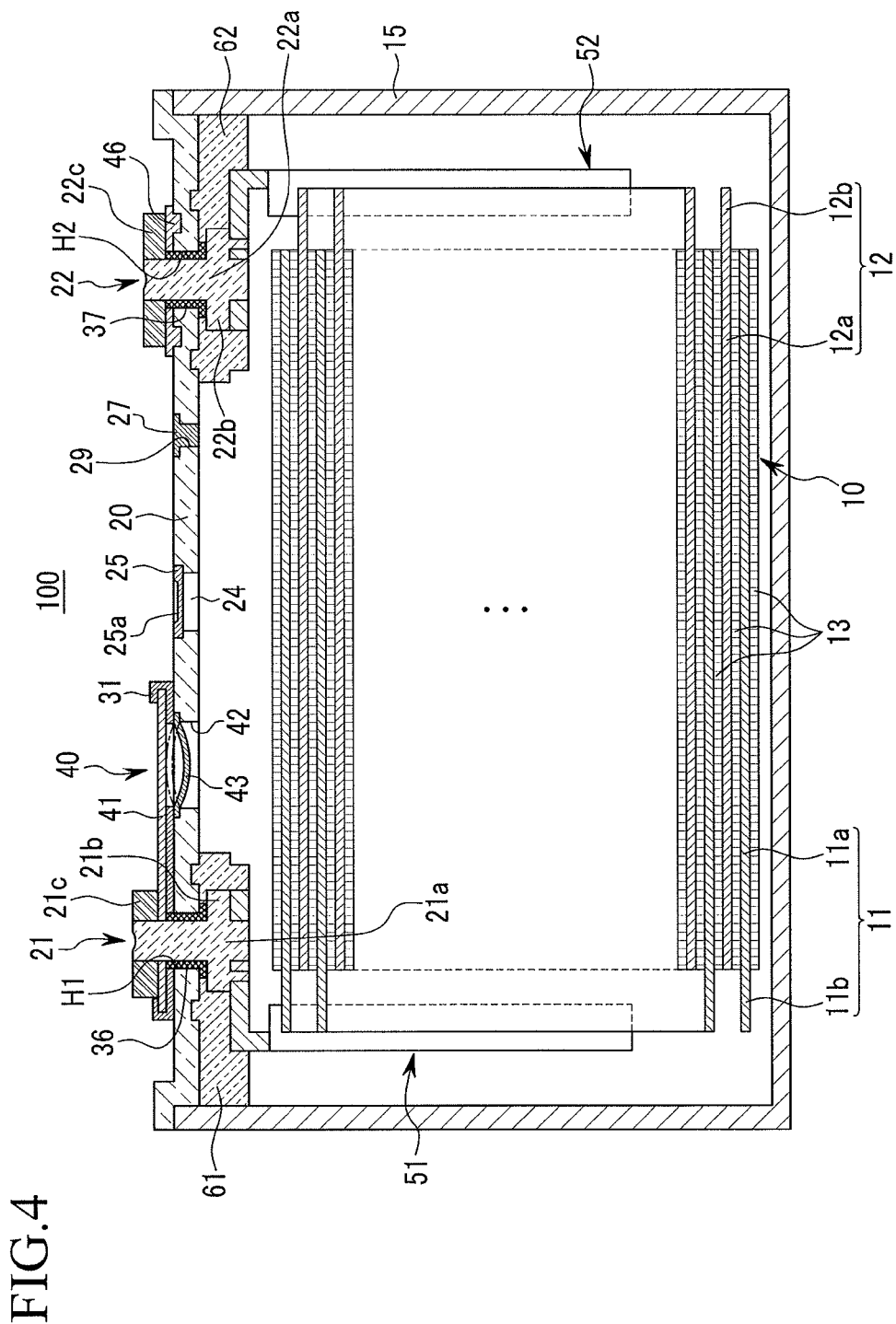
FIG. 4 illustrates a cross-sectional view taken along line IV-IV of FIG. 3.

FIG. 3 illustrates a perspective view of the unit cell 100, and FIG. 4 is a cross-sectional view taken along line IV-IV of FIG. 3.

Referring to FIGS. 3 and 4, the unit cell 100 may include an electrode assembly 10 for charging and discharging a current, a case 15 for accommodating the electrode assembly 10, a cap plate 20 coupled to an opening of the case 15, a first electrode terminal (hereinafter, referred to as "a negative terminal") 21 and a second electrode terminal (hereinafter, referred to as "a positive terminal") 22 installed at the cap plate 20, and an external short-circuit part 40 provided at one side, e.g., at the negative terminal 21 side.

For example, the electrode assembly 10 may be formed by disposing a first electrode (hereinafter, referred to as "a negative electrode") 11 and a second electrode (hereinafter, referred to as "a positive electrode") 12 on both surfaces of a separator 13, which is an insulation body, and winding the negative electrode 11, the separator 13, and the positive electrode 12 in a jelly-roll state. The negative electrode 11 and the positive electrode 12 may include respective coated regions 11a and 12a, in which an active material is coated on a current collector of a metal plate, and respective uncoated regions 11b and 12b, on which an active material is not coated and which are formed as exposed current collectors. The uncoated region 11b of the negative electrode 11 is formed at an end of one side of the negative electrode 11 along the wound negative electrode 11. The uncoated region 12b of the positive electrode 12 is formed at an end of one side of the positive electrode 12 along the wound positive electrode 12. The uncoated regions 11b and 12b are disposed at both ends of the electrode assembly 10, respectively.

For example, the case 15 may be formed in a shape of an approximate cuboid so as to define a space accommodating the electrode assembly 10 and an electrolyte solution therein, and is provided with an opening connecting an external side and an internal space on one surface of the cuboid. The opening allows the electrode assembly 10 to be inserted into the case 15.

The cap plate 20 is installed at the opening of the case 15 to seal the case 15. For example, the case 15 and the cap plate 20 may be formed of aluminum to be welded with each other.

Further, the cap plate 20 may include an electrolyte solution injection opening 29, a vent hole 24, and terminal holes H1 and H2. The electrolyte injection opening 29 allows the electrolyte solution to be injected into the case 15 after the cap plate 20 is coupled to the case 15. After the injection of the electrolyte solution, the electrolyte solution injection opening 29 is sealed with a sealing stopper 27.

The vent hole 24 is sealed with a vent plate 25 so as to discharge an internal pressure of the rechargeable battery. When the internal pressure of the rechargeable battery reaches a predetermined pressure, the vent plate 25 is incised to open the vent hole 24. The vent plate 25 has a notch 25a inducing the incision.

The negative terminal 21 and the positive terminal 22 are installed at the terminal holes H1 and H2 of the cap plate 20, and are electrically connected to the electrode assembly 10. That is, the negative terminal 21 is electrically connected to the negative electrode 11 of the electrode assembly 10, and the positive terminal 22 is electrically connected to the positive electrode 12 of the electrode assembly 10. Accordingly, the electrode assembly 10 is drawn out to the outside of the case 15 through the negative terminal 21 and the positive terminal 22.

The negative terminal 21 and the positive terminal 22 have a same structure inside the cap plate 20, so that the same structure will be described together. Further, as the negative terminal 21 and the positive terminal 22 have different structures at an external side of the cap plate 20, the different structures will be described separately.

The negative and positive terminals 21 and 22 include rivet terminals 21a and 22a installed at the terminal holes H1 and H2 of the cap plate 20, respectively, flanges 21b and 22b widely and integrally formed with the rivet terminals 21a and 22a inside the cap plate 20, and plate terminals 21c and 22c disposed at the external side of the cap plate 20 to be connected to the rivet terminals 21a and 22b by riveting or welding. Negative and positive gaskets 36 and 37 are installed between the rivet terminals 21a and 22a of the negative and positive terminals 21 and 22 and internal surfaces of the terminal holes H1 and H2 of the cap plate 20, to seal and electrically insulate spaces between the rivet terminals 21a and 22a of the negative and positive terminals 21 and 22 and the cap plate 20. The negative and positive gaskets 36 and 37 are installed to be further extended to the spaces between the flanges 21b and 22b and an internal surface of the cap plate 20 to further seal and electrically insulate the spaces between the flanges 21b and 22b and the cap plate 20. That is, the negative and positive gaskets 36 and 37 prevent the electrolyte solution from leaking through the terminal holes H1 and H2 by installing the negative and positive terminals 21 and 22 at the cap plate 20.

Negative and positive electrode lead tabs 51 and 52 electrically connect the negative and positive terminals 21 and 22 to the negative and positive electrodes 11 and 12 of the electrode assembly 10, respectively. That is, the negative and positive lead tabs 51 and 52 are connected to lower ends of the rivet terminals 21a and 22a while supporting the flanges 21b and 22b, i.e., the negative and positive lead tabs 51 and 52 may be coupled to and caulked with the lower ends of the rivet terminals 21a and 22a.

Negative and positive insulation members 61 and 62 are installed between the negative and positive lead tabs 51 and 52 and the cap plate 20 to electrically insulate the negative and positive lead tabs 51 and 52 from the cap plate 20, respectively. Further, one side of each of the negative and positive insulation members 61 and 62 is coupled to the cap plate 20, and the other side of each of the negative and positive insulation members 61 and 62 surrounds the negative and positive lead tabs 51 and 52, the rivet terminals 21a and 22a, and the flanges 21b and 22b to stabilize a connection structure thereof.

An external short-circuit part 40 will be described in relation to the plate terminal 21c of the negative terminal 21, and a top plate 46 will be described in relation to the plate terminal 22c of the positive terminal 22.

The external short-circuit part 40 at the negative terminal 21 side may include a short-circuit tab 41 and a short-circuit member 43 spaced or short-circuited according to an internal pressure. The short-circuit tab 41 is electrically connected to the rivet terminal 21a of the negative terminal 21 to be disposed at the external side of the cap plate 20 with an insulation member 31 interposed therebetween.

The insulation member 31 is installed between the short-circuit tab 41 and the cap plate 20 to electrically insulate the short-circuit tab 41 from the cap plate 20. That is, the cap plate 20 maintains a state in which the cap plate 20 is electrically insulated from the negative terminal 21.

The short-circuit tab 41 and the plate terminal 21c are coupled to an upper end of the rivet terminal 21a to caulk the upper end, so that the short-circuit tab 41 and the plate terminal 21c are coupled to the upper end of the rivet terminal 21a. Accordingly, the short-circuit tab 41 and the plate terminal 21c are fixed to the cap plate 20 with the insulation member 31 interposed therebetween.

The short-circuit member 43 is installed in a short-circuit hole 42 formed at the cap plate 20. The short-circuit tab 41 is connected to the negative terminal 21 to elongate along an external side of the short-circuit member 43. Accordingly, the short-circuit tab 41 and the short-circuit member 43 correspond to the short-circuit hole 42, face each other to maintain a spaced state (a state indicated by a solid line), and may form a short-circuit state (a state indicated by an imaginary line) by an inversion of the short-circuit member 43 when an internal pressure of the rechargeable battery is increased.

The top plate 46 at the positive terminal 22 side electrically connects the plate terminal 22c of the positive terminal 22 and the cap plate 20. For example, the top plate 46 is interposed between the plate terminal 22c and the cap plate 20, and permits the rivet terminal 22a to pass through.

Accordingly, the top plate 46 and the plate terminal 22c are coupled to the upper end of the rivet terminal 22a by coupling the top plate 46 and the plate terminal 22c to the upper end of the rivet terminal 22a and caulking the upper end thereof. The plate terminal 22c is installed at the external side of the cap plate 20 with the top plate 46 interposed therebetween.

In the meantime, the positive gasket 37 is installed to be further extended to the space between the rivet terminal 22a and the top plate 46. That is, the positive gasket 37 prevents the rivet terminal 22a and the top plate 46 from being electrically and directly connected with each other. That is, the rivet terminal 22a is electrically connected to the top plate 46 through the plate terminal 22c.

Figure 5:
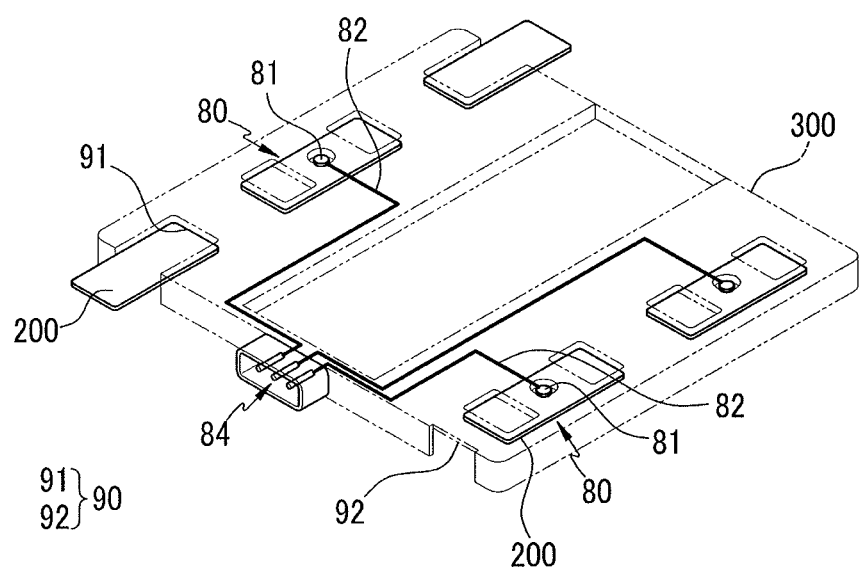
FIG. 5 illustrates a perspective view illustrating a disposition of a signal terminal and a signal line included in a cover, and a bus bar.

FIG. 5 illustrates a perspective view of a disposition state of a signal terminal 81 and a signal line 82 included in the cover 300, and the bus bar 200. Referring to FIG. 5, the cover 300 may include a coupling part 70 (FIGS. 6-8) to be coupled with the bus bar 200 connecting the negative and positive terminals 21 and 22, and a signal detector 80 connected to the bus bar 200 to detect a signal for information.

That is, when the rechargeable battery module is manufactured, the bus bar 200 is accurately disposed at the negative and positive terminals 21 and 22, which are the targets for the connection, via the coupling part 70. Further, the signal detector 80 may be accurately disposed at the bus bar 200, which is the target for the detection, as a process of disposing the unit cells 100 and the cover 300 on the unit cells 100.

Figure 6:
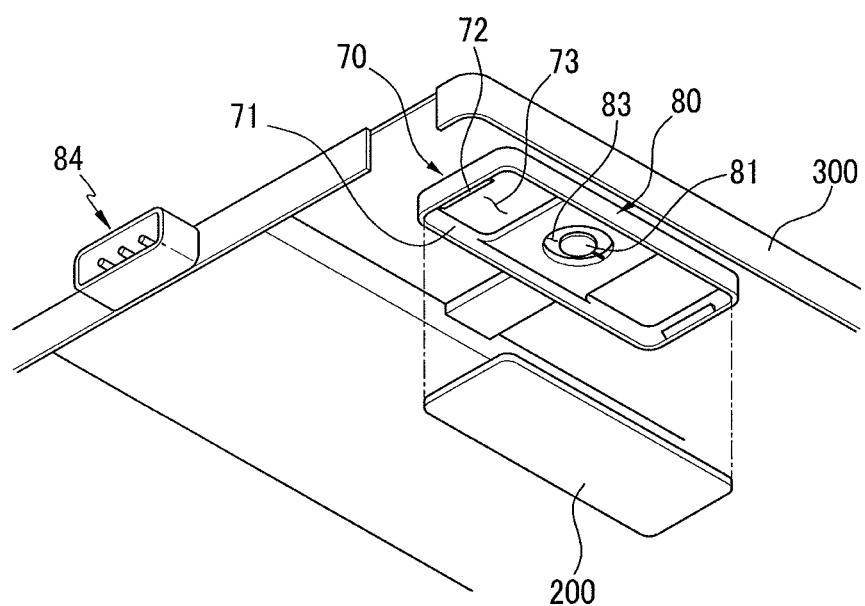
FIG. 6 illustrates a perspective view of a state before the bus bar is fastened to the cover.
Figure 7:
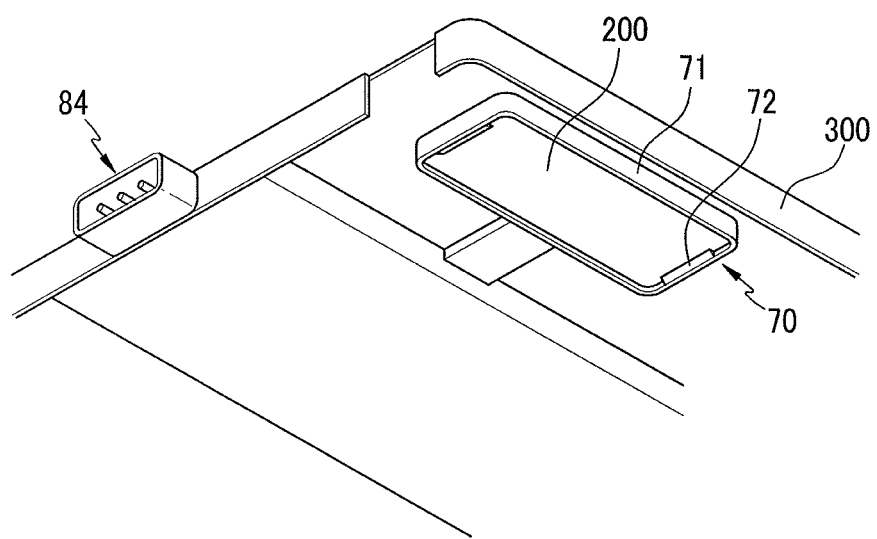
FIG. 7 illustrates a perspective view of a state after the bus bar is fastened to the cover.
Figure 8:
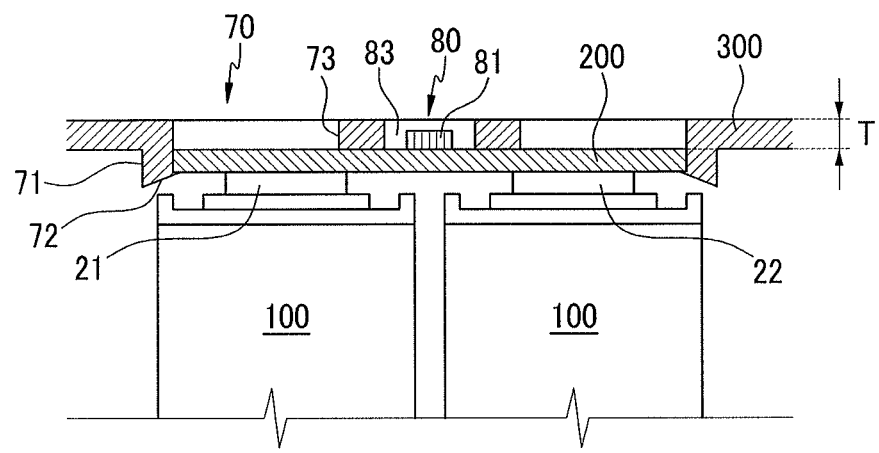
FIG. 8 illustrates a cross-sectional view taken along line VIII-VIII of FIG. 1.

FIG. 6 illustrates a perspective view of a state before the bus bar 200 is fastened to the cover 300, FIG. 7 illustrates a perspective view of a state after the bus bar 200 is fastened to the cover 300, and FIG. 8 illustrates a cross-sectional view taken along line VIII-VIII of FIG. 1. Referring to FIGS. 6 to 8, the coupling part 70 includes an accommodation part 71 for accommodating the bus bar 200, and hooks 72 for fixing the accommodation part 71 to the bus bar 200.

The accommodation part 71 protrudes downwardly from the cover 300, e.g., from a surface of the cover 300 facing the unit cells 100, along a circumference of the bus bar 200. The hooks 72 protrude from sides of the accommodation part 71, e.g., the hooks 72 may protrude from two opposite sides of the accommodation part 71 and may face each other, to be latched to the inserted bus bar 200 and to fix the bus bar 200 within the accommodation part 71.

That is, the bus bar 200 is inserted from a lower side of the accommodation part 71 to an upper portion to be fixed with the hooks 72, so that the bus bar 200 may be integrally treated with the cover 300 when the module is assembled. In other words, as illustrated in FIG. 6, the accommodation part 71 may extend away from the cover 300 to define a predetermined space adjacent to the cover 300, e.g., the predetermined space may have approximately a same size as the bus bar 200. As illustrated in FIG. 7, the bus bar 200 may be inserted into the predetermined space defined by the accommodation part 71, such that the accommodation part 71 contacts and surrounds an entire perimeter of the bus bar 200. The hooks 72 may be at a bottom of the accommodation part 71, e.g., at an edge of the accommodation part 71 farthest from the cover 300, to affix the bus bar 200 in the predetermined space. Accordingly, as the bus bar 200, e.g., a plurality of bus bars 200, may be affixed to the cover 300 to become integral with the cover 300, the module assembling process may be simplified.

As illustrated in FIGS. 6 and 8, the cover 300 may further include first through-openings 73. The first through-openings 73 may be formed to expose the bus bar 200 affixed into the accommodation part 71 and to correspond to the negative and positive terminals 21 and 22 of a pair of adjacent unit cells 100. That is, as illustrated in FIG. 8, the negative and positive terminals 21 and 22 of a pair of adjacent unit cells 100 may contact the bus bar 200 in areas overlapping the first through-openings 73 of the cover 300.

Accordingly, in a state where the cover 300 is assembled with the unit cells 100, the first through-openings 73 enable a welding torch (not illustrated) to approach the bus bar 200. That is, the first through-openings 73 expose an area of the bus bar 200 that is in contact with the negative and positive terminals 21 and 22, i.e., the exposed area of the bus bar 200 and the terminals are on opposite surfaces of the bus bar 200. Therefore, the first through-openings 73 allow welding of the bus bar 200, which is integrally coupled to the cover 300, to the negative and positive terminals 21 and 22 of the unit cells 100.

Referring to FIGS. 5 and 6, the signal detector 80 may include the signal terminal 81 connected to the bus bar 200, and the signal line 82 connected to the signal terminal 81. The signal terminal 81 may correspond to, e.g., be positioned on, the upper portion of the bus bar 200 to be exposed through a second through-opening 83.

The second through-opening 83 may be formed between a pair of first through-openings 73 in the cover 300 to enable the signal terminal 81 integrally formed with the cover 300 to be connected to the bus bar 200 by welding or soldering. In this case, the signal line 82 may be embedded in the cover 300, and the signal line 82 may be connected to the signal terminal 81 to be disposed at the second through-opening 83.

The signal detector 80 further includes a first connector 84 connected to the signal line 82. That is, the first connector 84 may be provided at one side of the cover 300 to transmit the signal for information detected through the signal terminal 81 and the signal line 82 to a controller (not illustrated). That is, a second connector 85 (see FIG. 1) connected to the controller may be connected to the first connector 84 included in the cover 300.

Figure 9:
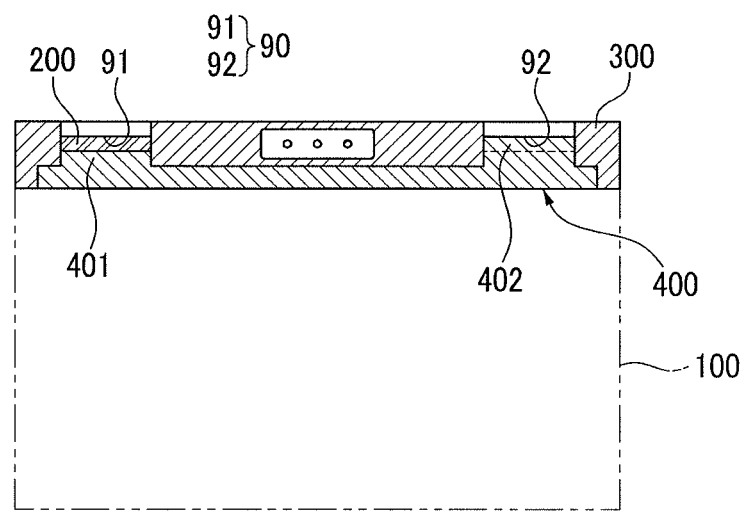
FIG. 9 illustrates a cross-sectional view taken along line IX-IX of FIG. 1.

FIG. 9 illustrates a cross-sectional view taken along line IX-IX of FIG. 1. Referring to FIGS. 2, 5, and 9, the cover 300 may further include a drawing part 90 provided at the external side of the coupling part 70 disposed at the outermost region to draw out the bus bar 200. For example, the drawing part 90 may be divided into a first drawing part 91 and the second drawing part 92 according to the disposition of the bus bar 200.

The bus bar 200 in the present exemplary embodiment is drawn out to the first drawing part 91, but is not drawn out to the second drawing part 92. The first drawing part 91 corresponds to the bus bar 200 drawn out to the outside of the cover 300 (a left side of FIG. 9), and the second drawing part 92 is disposed at one side of the bus bar 200 accommodated inside the cover 300 (a right side of FIG. 9).

The first and second drawing parts 91 and 92 may be formed at one side surface among four side surfaces of the cover 300, or at both sides in opposed directions according to a serial or parallel connection of the unit cells 100 and the number of unit cells 100.

Referring back to FIGS. 2, 5, and 9, the rechargeable battery module may further include a gasket 400 provided between the unit cells 100 and the cover 300. The gasket 400 may include first protrusions 401 and second protrusions 402 formed to correspond to the first and second drawing parts 91 and 92, respectively.

The first protrusions 401 may be disposed at the first drawing part 91 to seal a space between the bus bar 200 and the unit cells 100. The second protrusions 402 may be disposed at the second drawing part 92 to seal the space between the second drawing part 92 and the unit cells 100, and are formed to protrude higher than the first protrusions 401. The second protrusions 402 may be formed to be higher by a thickness T of the bus bar 200 positioned at the first drawing part 91.

The gasket 400 prevents moisture from permeating into the negative and positive terminals 21 and 22 through the spaces between the unit cells 100 and the cover 300, and the first and second protrusions 401 and 402 prevent moisture from permeating through the first and second drawing parts 91 and 92. The gasket 400 may include the first and second protrusions 401 and 402 in accordance with a number of unit cells 100 and the positions of the first and second drawing parts 91 and 92 and according to the serial or parallel connection of the unit cells 100.

According to the exemplary embodiment, a cover of a battery module may include a coupling part and a signal detector to couple the cover with the bus bar and with the unit cells, thereby accurately disposing the bus bar at the electrode terminals of the unit cells. Accordingly, it is possible to easily connect the bus bar and the electrode terminals, to easily connect the signal detector and the bus bar, to improve reliability of a connection of the bus bar and a detection of a signal, and to simplify a module assembling process. In contrast, a conventional module assembling process of connecting the bus bars to the plurality of unit cells and connecting each signal terminal to the bus bar may be complex, and reliability for the connection of the bus bar and the connection of the signal terminal is low.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A rechargeable battery module, comprising:
   a plurality of unit cells including rechargeable batteries and adjacently disposed; at least one bus bar connecting electrode terminals of adjacent unit cells of the plurality of unit cells; and
   a cover configured to cover the plurality of unit cells, the cover including:
   a coupling part coupled with the at least one bus bar, wherein the coupling part includes an accommodation part protruding downwardly from the cover along a circumference of the bus bar, and a plurality of hooks protruding from sides of the accommodation part, the plurality of hooks being configured to affix the bus bar to the accommodation part;
   a signal detector electrically connected to the bus bar; and
   first through-openings, the first through-openings corresponding to the electrode terminals of adjacent unit cells and extending from an upper surface of the cover to a lower surface of the cover,
   wherein the signal detector includes:
   a signal terminal exposed through a second through-opening in the cover that extends from the upper surface of the cover to the lower surface of the cover, the signal terminal corresponding to an upper portion of the bus bar and being connected to the bus bar; and
   a signal line embedded in the cover and connected to the signal terminal.

2. The rechargeable battery module as claimed in claim 1, wherein the signal detector further comprises a connector at one side of the cover, the connector being connected to the signal line.

3. The rechargeable battery module as claimed in claim 1, further comprising a gasket between the unit cells and the cover.

4. The rechargeable battery module as claimed in claim 3, wherein the cover further comprises a drawing part at an external side of the coupling part, the drawing being at an outermost region and being configured to draw out the bus bar.

5. The rechargeable battery module as claimed in claim 4, wherein the drawing part includes:
   a first drawing part in which the bus bar drawn out to the outside of the cover is disposed, and
   a second drawing part disposed at one side of the bus bar accommodated inside the cover.

6. The rechargeable battery module as claimed in claim 1, wherein the at least one bus bar is connected to the coupling part of the cover and to electrode terminals of adjacent unit cells, the at least one bus bar being between the cover and the unit cells.

7. The rechargeable battery module as claimed in claim 1, wherein the first through-openings extend through the entire cover and expose the at least one bus bar, the first through-openings overlapping the electrode terminals of adjacent unit cells connected by the at least one bus bar.

8. The rechargeable battery module as claimed in claim 7, wherein the coupling part surrounds two first through-openings of the first through-openings, the two first through-openings overlapping the electrode terminals of two adjacent unit cells connected by the at least one bus bar.

9. A rechargeable battery module, comprising:
- a plurality of unit cells including rechargeable batteries and adjacently disposed;
- at least one bus bar connecting electrode terminals of adjacent unit cells of the plurality of unit cells;
- a cover configured to cover the plurality of unit cells, the cover including:
    - a coupling part coupled with the at least one bus bar,
    - a signal detector electrically connected to the bus bar, and
    - a drawing part at an external side of the coupling part, the drawing being at an outermost region and being configured to draw out the bus bar,
  wherein the drawing part includes:
    - a first drawing part in which the bus bar drawn out to the outside of the cover is disposed, and
    - a second drawing part disposed at one side of the bus bar accommodated inside the cover;
- a gasket between the unit cells and the cover,
  wherein the gasket includes:
    first protrusions at the first drawing part and configured to seal spaces between the bus bar and the unit cells, and
    second protrusions at the second drawing part and configured to seal spaces between the second drawing part and the unit cells, and protruding higher than the first protrusions.

* * * * *